Patented June 17, 1952

2,600,988

UNITED STATES PATENT OFFICE 2,600,988

CONSTANT SURFACE SPEED LATHE

Claude E. Greene and Robert B. Lesher, Sidney, Ohio, assignors to The Monarch Machine Tool Company, a corporation of Ohio Application June 21, 1947, Serial No. 756,306

9 Claims. (Cl. 318—12)

The invention relates generally to control systems, and more particularly to electrical control systems for use with a machine tool.

An object of the invention is the provision of a control system for a lathe for automatically varying the speed of the spindle to maintain a constant surface cutting speed of a workpiece at any continuously variable predeterminable speed setting.

Another object of the invention is the provision of a control system for a lathe wherein the spindle motor is capable of being manually varied in speed over a range at least equal to the difference between successive gear ratios of the lathe and is also capable of being automatically varied over a second range of speed in accordance with variation in the movement of the cross-slide in order to maintain a substantially constant surface cutting speed of a workpiece.

Figure 1:
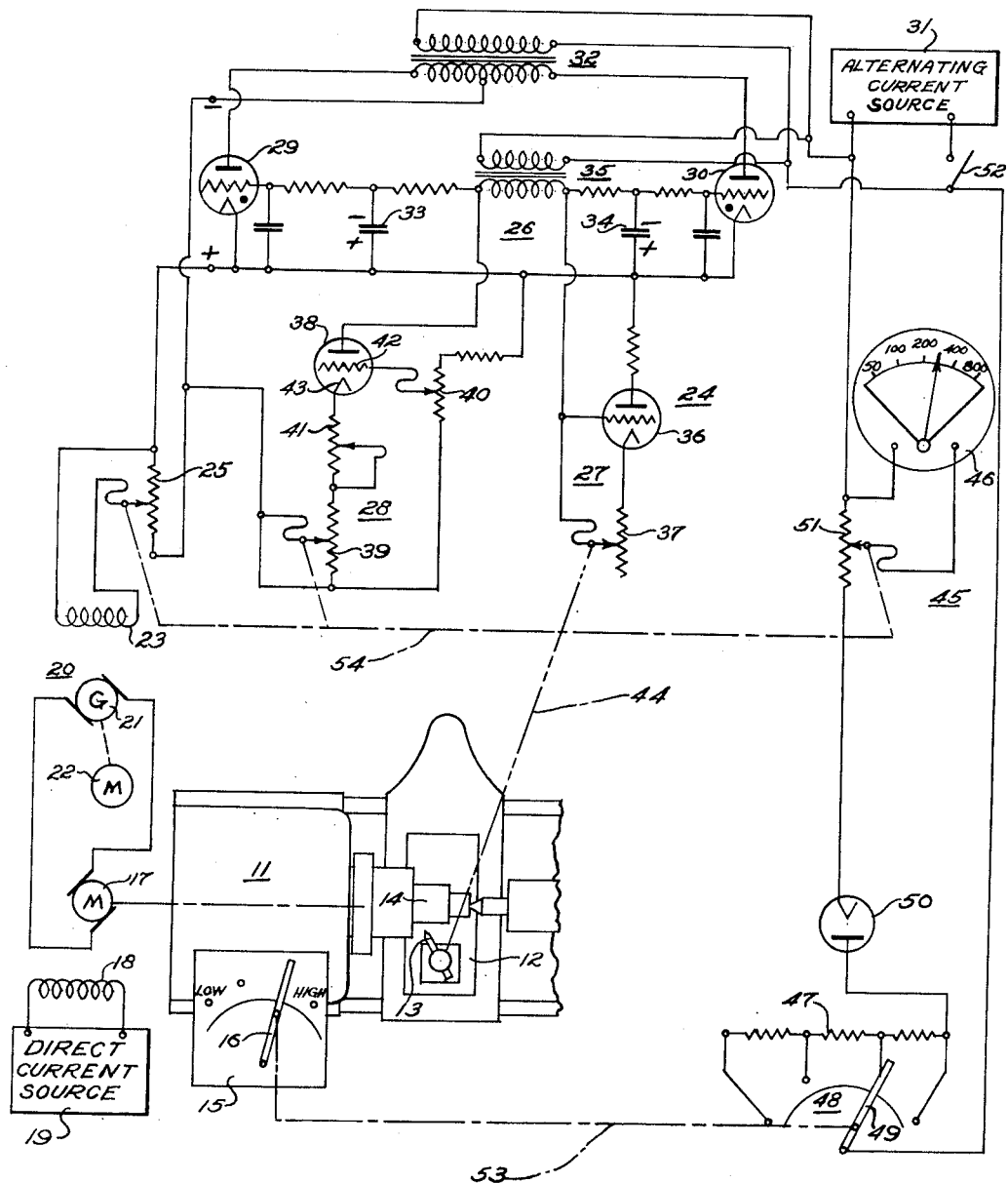
Figure 2:
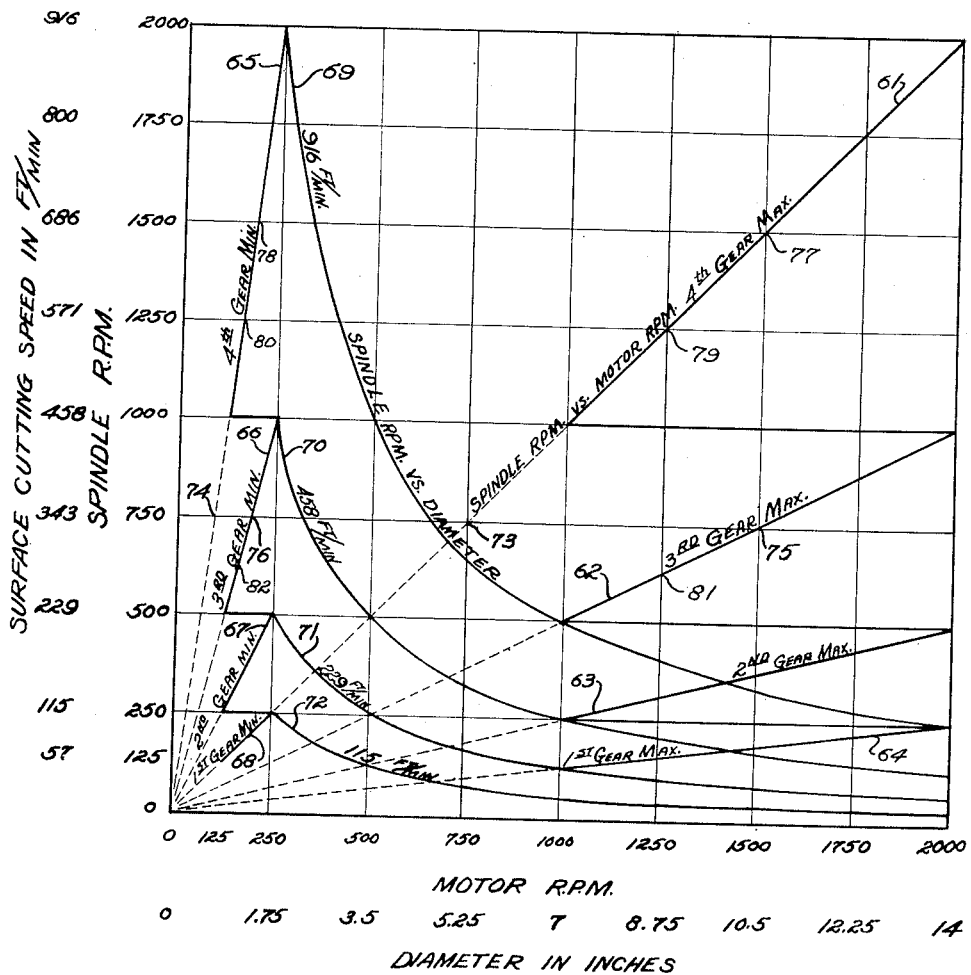

Other objects and a fuller understanding of the invention may be had by referring to the following description and claims, taken in conjunction with the accompanying drawing, in which:

Figure 1 diagrammatically depicts a control system for a lathe incorporating the features of the invention; and Figure 2 is a graph of the spindle vs. motor speeds and also spindle speed vs. diameter of the workpiece in inches.

The invention relates generally to all forms of machines having a rotating body, and more particularly to machine tools that have a rotating workpiece to be cut. Although it will readily be seen that the invention may be adapted for use with any form of machine tool, such as a milling machine, we have chosen to show the preferred embodiment of our invention as adapted for use with an engine lathe.

The control system is shown as being used with a lathe 11 that has a cross-slide 12 for carrying a tool 13 to cut a workpiece 14. The lathe has a customary gear box 15 with a gear lever 16 for selecting one of a plurality of different gearing means for driving the workpiece 14 at different speeds. A spindle motor 17 is shown for rotating the workpiece 14. We have chosen to show the spindle motor 17 as a direct current motor, having a field 18 that is excited from a direct current source 19. A direct current generator 20 is adapted to supply direct current energy to the spindle motor 17. The direct current generator 20 has an armature 21 adapted to be driven by a prime mover 22, and a field 23. The generator field 23 is adapted to be supplied by a controllable rectifier 24. The controllable rectifier 24 is adapted to supply energy to a first potentiometer 25, which in turn is adapted to supply a varying voltage to the generator field 23. The controllable rectifier 24 includes a full-wave gaseous rectifier system 26, a first biasing means 27 for varying the bias of said gaseous rectifier system 26, and compensating means 28 for compensatingly varying the bias of said gaseous rectifier system 26 in accordance with varying load requirements of the controllable rectifier 24. The gaseous rectifier system 26 is shown as a full-wave rectifier system employing first and second rectifier tubes 29 and 30. The gaseous rectifier system 26 is supplied from an alternating current source 31 through a transformer 32. The gaseous rectifier system 26 is shown as being controlled by a direct current bias with an alternating current rider, the direct current bias being supplied by the charge on condensers 33 and 34 as charged by grid current flow, and the alternating current rider is furnished by a grid transformer 35. The upper plates of the condensers 33 and 34 are negative with respect to the lower plate thereof, as shown in the figure, so that the rectifier system 26 biases itself nearly to cut-off by the charge on these condensers 33 and 34. The first biasing means 27 includes a first thermionic tube 36 and a second potentiometer 37. The first thermionic tube 36 is so connected to the gaseous rectifier system 26 so that the first thermionic tube 36 discharges the condensers 33 and 34 at a rate determined by the setting of the second potentiometer 37. The compensating means 28 includes a second thermionic tube 38, a third potentiometer 39, a maximum speed potentiometer 40 and a minimum speed potentiometer 41. The second thermionic tube 38 has a grid 42 and a cathode 43. The cathode 43 is connected through the minimum speed potentiometer 41 and the third potentiometer 39 to the negative terminal of the gaseous rectifier system 26. The maximum speed potentiometer 40 is connected between the positive and negative terminals of the gaseous rectifier system, and the grid 42 is connected to this maximum speed potentiometer 40 to obtain a positive potential therefrom relative to the cathode 43.

A linkage means 44 is adapted to connect the cross-slide 12 with the second potentiometer 37 and serves the purpose of varying the bias on the first thermionic tube 36, which in turn varies the output of the controllable rectifier 24. The output of the controllable rectifier 24 supplies a varying voltage to the field 23 through the manually controllable first potentiometer 25. This variable voltage applied to the generator field 23 is used to control the output voltage of the generator 20, which in turn controls the speed of the spindle motor 17, and thereby through the gearbox 15 controls the rotational speed of the workpiece 14. Constant surface cutting speed may therefore be obtained by having the cross-slide vary the speed of the workpiece 14 as the cross-slide 12 moves the tool 13 relative to the axis of the workpiece 14.

Indicating means 45 is incorporated into the control system to provide a convenient method of determining the surface speed at which the control system is set at any given time. The indicating means 45 includes an indicating member 46 which is shown as a direct current voltmeter, a tapped resistor 47 having a plurality of taps, a tap switch 48 having a switch lever 49, and with the tap switch connected to the taps on the tap resistor 47, a third rectifier tube 50 and a fourth potentiometer 51. The fourth potentiometer 51, the third rectifier tube 50, and the tapped resistor 47 with the tap switch 48 in parallel therewith are connected in series across the alternating current source 31 to obtain a source of voltage. A switch 52 is connected in the line from the alternating current source 31, and serves to control the flow of power to both the indicating means 45 and the controllable rectifier 24. The indicating meter 46, for this preferred embodiment of our invention, has been shown as a direct current voltmeter that indicates the rectifier voltage across the fourth potentiometer 51. Linkage means 53 connects the switch lever 49 to the gear lever 16 of the gear box 15 so that these two levers are moved in direct accord. Linkage means 54 is used to interconnect the first potentiometer 25, the third potentiometer 39, and the fourth potentiometer 51 so that these three potentiometers move in unison.

The operation of the control system is adapted to provide a continuously variable surface cutting speed of the workpiece 14 by the tool 13, and to maintain this surface cutting speed constant over a wide range of distance moved by the tool 13. It will be apparent that when the tool 13 is cutting at the largest diameter of the workpiece 14, the spindle motor 17 will be running at its slowest speed with the spindle motor increasing in speed as the tool 13 is moved toward the axis of the workpiece 14, and the speed of the spindle motor 17 approaching infinity as the tool 13 approaches this axis of the workpiece 14. To approach an infinite speed is impractical, therefore the range of speed of this spindle motor 17 has been limited to a practical and useful range, and in its preferred embodiment of the invention has been chosen to be about an eight-to-one range of speed of this spindle motor 17. This means that the second potentiometer 37 must vary the output of the controllable rectifier 24 over a range of eight-to-one in order to obtain this variation of eight-to-one in the speed of the spindle motor 17. The first biasing means 27 is easily capable of causing this eight-to-one variation in the output of the controllable rectifier 24. The first biasing means is so controlled by the cross-slide 12 that as the cross-slide 12 moves the tool 13 toward the axis of the workpiece 14, the movement of the second potentiometer 37 causes a lesser bias on the first thermionic tube 36, the first thermionic tube 36 therefore passes a greater amount of current to discharge the condensers 33 and 34 to a greater degree, which establishes a lesser direct current bias on the gaseous rectifier system 26, permitting a greater power output from the controllable rectifier 24 to thereby increase the speed of the spindle motor 17. Thus it will be seen that as the tool 13 moves toward the axis of the workpiece 14, the rotational speed of the workpiece is increased to provide a constant surface cutting speed over a range fixed by the limits of the control system and by the limits of movement of the cross-slide 12, which range in the preferred embodiment of the invention has been chosen as eight to one.

The gearbox 15 has been shown as having four selectable gearing means, selectable by the gear lever 16. The gearing means may be of a conventional form, and may have any suitable ratio between successive gearing means. The gearing means should preferably have identical or nearly identical steps or increments between successive gearing means. If the increments are identical, then each gear speed would be X times as great as the preceding gear speed. The increment X would be a number in the order of 2, or 3, and merely by way of example, the value of 2 for X has been chosen. This would mean that if 250 R. P. M. was the maximum speed of the spindle or workpiece 14 for the maximum or rated speed of the spindle motor 17 in first gear, then second gear would cause a doubling of this maximum speed, or 500 R. P. M., the third gear giving a maximum of 1000 R. P. M., and the high speed giving a maximum of 2000 R. P. M. of this spindle or workpiece 14. By way of illustration, let it be assumed that the workpiece 14 has a maximum diameter of 14 inches, which would mean a minimum diameter of 1.75″ for the illustration of 8:1 variation in speed mentioned above. In fourth gear, with a maximum spindle or workpiece speed of 2000 R. P. M., and a minimum speed of 250 R. P. M., the maximum surface cutting speed would be 916 feet per minute. This may be calculated by the formula: diameter $\times \pi \times$ R. P. M.=surface feet per minute (ft./min.).

$$\frac{14''}{12}\times \pi \times 250 = 916'/\text{min.} = \frac{1.75''}{12}\times \pi \times 2000$$

Therefore, the maximum surface speed in fourth gear would be 916′/min; in third gear, 458′/min; in second gear 229′/min; and in first gear, 115′/min.

In the prior art practice of control systems, it was only possible to obtain a constant surface cutting speed over the full range at any one of the gearing means in the gearbox 15. The present invention provides for constant surface cutting speed of the given range, in this case eight-to-one, over a continuously variable range of speeds. The first potentiometer 25 is used to provide this feature of continuously variable range of speed, and in the preferred embodiment of the invention is shown as being manually controllable. The first potentiometer 25, as hereinbefore stated, is across the output of the controllable rectifier 24, and controls the amount of voltage applied to the generator field 23. The first potentiometer 25 has a range of variation at least equal to the increment between the speed ratios of successive gearing means of the gearbox 15. Since we have chosen to show the successive gearing means of the gearbox 15 as having a two-to-one increment or step between successive speed ratios, we have so constructed the first potentiometer 25 to obtain at least a two-to-one variation in the output voltage of the controllable rectifier 24 that is applied to the generator field 23. The voltage output from the controllable rectifier 24 therefore is manually controllable by the first potentiometer 25 to obtain a two-to-one speed variation in the spindle motor 17 and therefore effect a two-to-one variation in the rotational speed of the workpiece 14, in addition to the speed range afforded by the gearing means of the gearbox 15. The combination of the two-to-one speed variation provided by the first potentiometer 25, and the speed range obtainable by selecting gears of the gearbox 15, provides the aforementioned result of obtaining a continuously variable speed range within the capabilities of the particular machine. The eight-to-one variation in the speed of the spindle motor 17 in accordance with movements of the cross-slide 12 is not altered by this variation in the output voltage by the first potentiometer 25.

If the lathe operator desires any cutting speed between 916 and 458 feet per minute, the operator will move the gear lever 16 to the high position thereby obtaining a maximum surface speed of 916 ft./min. The first potentiometer 25 may then be manually varied to reduce this maximum speed of the spindle or workpiece 14 to the desired value. If the lathe operator desires a surface cutting speed below 458 R. P. M., the gear lever 16 is changed to the third position, obtaining a maximum surface cutting speed of 458 feet per minute, which may be reduced to as low as 229 feet per minute by the manual operation of the first potentiometer 25. In the low gear position of the gearbox 15, the surface cutting speed may be varied from a maximum of 115 to as low as 57 feet per minute, thereby permitting the operator the choice of any continuously variable surface cutting speed between 57 feet per minute and 916 feet per minte, which limits have been taken merely by way of example, and not as a limit to the capabilities of the control system.

To more fully explain the operation of the circuit, the Figure 2 will next be referred to. The Figure 2 shows straight lines depicting spindle speeds vs. motor speeds for the four gears as chosen in the example. The four gears have been shown as having a 2:1 variation between each successive gearing means. The fourth gear or highest gear has been shown as direct drive, that is, with a spindle speed of 2000 R. P. M. the motor speed is likewise 2000 R. P. M. For the third gear, a 2000 R. P. M. speed of the motor produces a 1000 R. P. M. speed of the spindle, and likewise second gear provides 500 R. P. M. maximum spindle speed and first gear provides maximum 250 R. P. M. spindle speed. The aforementioned spindle speeds are the maximum obtainable, and represent that speed obtained at a maximum motor speed. The line 61 shows the fourth gear maximum speed and is a 45 degree line as depicted on the graph of Figure 2. Likewise lines 62, 63 and 64 are the third, second and first gear maximum speeds respectively. The line 65 is the fourth gear minimum speed and likewise the lines 66, 67 and 68 are the third, second and first gear minimum speeds respectively. Since the second potentiometer 37 automatically provides an 8:1 variation in the speed of the spindle and the motor for any given surface cutting speed setting of the first potentiometer 25, this 8:1 variation in speed is represented by the horizontal distance between any pair of lines representing the maximum and minimum speeds obtainable in the particular gear ratio being used, such as between the lines 61 and 65.

The vertical scale has been shown as surface cutting speed as well as spindle R. P. M., and this surface cutting speed has been calculated for a workpiece diameter of 14 inches maximum. This 14 inch diameter maximum workpiece has been taken merely by way of example and does not represent a limit of the machine or control system. For a 14 inch diameter workpiece with a 250 R. P. M. spindle speed the surface cutting speed is calculated to be 916 surface feet per minute. To maintain this 916 surface cutting speed constant throughout the 8:1 range, the spindle speed must vary from 250 R. P. M. to 2000 R. P. M. as the workpiece diameter decreases to 1.75 inches, or one-eighth the original diameter. The curve 69 is a plot of the spindle R. P. M. vs. diameter for a surface cutting speed of 916 feet per minute. This curve 69 is a non-linear curve since the curve approaches the horizontal and vertical axes asymptotically. It will be seen that this curve 69 is a non-linear curve since the spindle speed must double each time the diameter halves. Curves 70, 71 and 72 are spindle R. P. M. vs. diameter curves also, and represent surface cutting speeds of 458 feet per minute, 229 feet per minute, and 115 feet per minute. The curves 70, 71 and 72 are non-linear, just as is the curve 69, and the curves 69, 70, 71 and 72 constitute a family of curves representing the various surface cutting speeds.

The operator need only know the type of material he is cutting and to be able to look up this material on a chart to show the correct surface cutting speed for that material. To obtain this particular surface cutting speed on this engine lathe incorporating the invention, the operator then selects a gear ratio that will permit him to have a maximum motor speed for the particular surface cutting speed desired. To illustrate, let us assume that the operator desires a surface cutting speed of 343 feet per minute. According to the graph of Figure 2, it will be seen that the operator could select fourth gear which would mean that he would commence operation at the point 73 since this is fourth gear maximum speed, and would end operation at the point 74 which is fourth gear minimum speed. However, this would mean this maximum motor speed would be only 37½ per cent of the rated speed of the motor. It will likewise be seen that the operator could select third gear and operate between the points 75 and 76, giving him a maximum speed of the motor of 75 per cent. Other choices would be possible as the material to be cut increases in hardness, therefore necessitating a lower surface cutting speed. As the surface cutting speed decreases, the operator should select a lower gear ratio such as second gear or even first gear in order to obtain this surface cutting speed while maintaining a motor speed as high as possible.

The compensating means 28 is provided to maintain the surface cutting speed more nearly constant throughout the range of movement of the cross-slide 12. As the first potentiometer 25 is moved downwardly, as shown in the figure, the output voltage applied to the generator field 23 is increased. This causes a heavier load to be placed on the controllable rectifier 24, and therefore the compensating means 28 has been provided to increase the output of the controllable rectifier 24 to eliminate what would otherwise be a slightly drooping characteristic in the voltage regulation of the controllable rectifier 24. The third potentiometer 39 of the compensating means 28 is connnected by the linkage means 54 to the first potentiometer 25, and as the first potentiometer 25 is moved downwardly, the third potentiometer 39 is also moved downwardly. This downward movement of the third potentiometer 39 increases the positive bias on the cathode 43 of the second thermionic tube 38, which decreases the electron flow through this second thermionic tube 38, which decreased flow of electron current charges the condensers 33 and 34 to a lesser degree, effecting a lesser bias on the gaseous rectifier system 26, with a consequently greater output from the controllable rectifier 24. It will thus be seen that as the first potentiometer 25 is moved downwardly to increase the voltage applied to the generator field 23, that the compensating means 28 causes the controllable rectifier 24 to produce a slightly greater output, thereby compensating for the increased load drawn by the generator field 23. In actual practice, we have been able to maintain the surface cutting speed constant within plus or minus 3 per cent for the entire range of the continuously variable surface cutting speeds of the lathe 11.

The indicating means 45 provides a simple and reliable means for determining the surface cutting speed. The linkage means 53 that interconnects the gear lever 16 and the switch lever 49 provides for cutting in more or less resistance of the tapped resistor 47 by the tap switch 48. Since the tapped resistor 47 is in series with the third rectifier tube 50 and the fourth potentiometer 51, the amount of resistance present in this circuit as established by the position of the switch lever 49 will effect the maximum voltage obtainable across the fourth potentiometer 51. The direct current voltmeter 46 is connected across the fourth potentiometer 51, and obtains a variable voltage therefrom. The fourth potentiometer 51 is connected by the linkage means 54 to the first potentiometer 25, and moves in accordance therewith. As shown in the figure, when the first potentiometer 25 is in its downmost position, that is, furnishing a maximum voltage output from the controllable rectifier 24 to the generator field, the fourth potentiometer 51 is likewise in its downmost position. In the downmost position of the fourth potentiometer 51, a maximum voltage from this fourth potentiometer 51 is applied to the indicating meter 46. The amount of resistance in the circuit of the indicating means 45 is then limited only by the amount of resistance determined by the tapped resistor 47 and the tap switch 48 connected thereacross. The constants of the circuit have been so established such that when the gear lever 16 is in the high or fourth speed position, and the fourth potentiometer 51 is in its downmost position, the indicating meter 46 will indicate a full-scale reading, which would be 916 feet per minute, according to the values given as examples hereinbefore stated. For convenience, the indicating meter 46 may be directly calibrated in surface feet per minute, rather than in volts. If the gear lever 16, and consequently the switch lever 49 is moved to the third position, the amount of resistance then introduced into the circuit of the indicating means 45 by the tapped resistor 47 will be sufficient to reduce the voltage drop across the fourth potentiometer 51 so that the indicating meter 46 will then read to the scale division indicating 458 surface feet per minute. The second and first positions of the gear lever 16 and switch lever 49 will then in a like manner produce scale readings of 229 and 115 surface feet per minute of the indicating meter 46. Since the fourth potentiometer 51 is directly connected by the linkage means 54 to the first potentiometer 25, as this first potentiometer 25 is moved upwardly to reduce the maximum amount of voltage applied to the generator field 23, the fourth potentiometer 51 will likewise move upwardly to reduce the voltage applied to the indicating meter 46, and thereby produce an indication of the variation between successive scale divisions on this indicating meter 46.

Our control system provides a substantially constant surface cutting speed, which in practice has been shown to be within plus or minus 3 per cent variation in the surface cutting speed at any predeterminable setting, and this accuracy is derived from a particular feature of our invention. As the cross-slide 12 moves inwardly, the rotational speed of the workpiece 14 must vary non-linearly in order to obtain constant surface cutting speed. This may be shown by the fact that as the cross-slide moves from its outermost position to a halfway position toward the axis of the workpiece 14, the speed of the workpiece 14 must double, and likewise as the cross-slide 12 again moves half the remaining distance toward the axis of the workpiece 14, the speed of the workpiece 14 must again double to maintain constant surface cutting speed. This shows that the speed of the workpiece 14 must double as the cross-slide 12 halves the remaining distance to the axis of the workpiece 14, or that the speed of the workpiece 14 must vary non-linearly with respect to the movement of the cross-slide 12. This is graphically shown by the curves 69, 70, 71 and 72 of Figure 2. To have the cross-slide 12 directly control a potentiometer across the output of a rectifier, that potentiometer would then need to be a tapered potentiometer which taper was non-linear. To construct such a taper potentiometer is extremely difficult, and would be subject to variations such that the surface cutting speed could not be maintained constant within the close limits of accuracy obtained by our system. In our control system, the second potentiometer 37 is a linear potentiometer so that this difficulty is obviated, and by the novel construction of our control system, this linear potentiometer 37 produces a non-linear variation in the output of the controllable rectifier 24, which non-linear variation is exactly that desired to be applied to the spindle motor 17 to maintain a constant surface cutting speed. The first potentiometer 25 is likewise made linear therefore obviating the necessity of a tapered potentiometer across the output of the controllable rectifier 24.

Although we have described our invention in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:

1. In combination with a machine having a first element and a rotating element, the provision of drive means for rotating said rotating element, means for providing relative movement between said first element and the axis of said rotating element, power transmission means having a plurality of selectable speed ratios for connecting said drive means to said rotating element, automatic means for varying the speed of said drive means over a first speed range in accordance with the relative movement between said first element and the axis of said rotating element, and electric means independent of said automatic means for varying the speed of said drive means over a second speed range at least equal to the increment between successive speed ratios of said power transmission means.

2. In combination with a machine having a rotating element, the provision of a control system for obtaining any continuously variable predeterminable rotational speed of said rotating element, said control system comprising, drive means for rotating said rotating element, electric means for controlling the rotational speed of said drive means, a controllable rectifier system for applying a variable voltage to said electric means, a plurality of selectable power transmission means having different speed ratios for connecting said drive means to said rotating element, and means for varying said electric means to vary the speed of said drive means over a speed range at least equal to the increment between the speed ratios of successive power transmission means.

3. A control system for an electric motor providing relative rotational movement between first and second members, said first and second members adapted to have a relative translational movement, said system comprising dynamoelectric means having a variable energy output for controlling the rotational speed of said electric motor, a controllable rectifier system for applying a variable voltage to said dynamoelectric means, linearly variable means for automatically varying the output of said controllable rectifier in accordance with said translational movement of said members, and manual means for predeterminably selecting any relative rotational surface speed of said members over a continuously variable range, said manual means including a plurality of selectable power transmission means having different speed ratios for connecting said electric motor to at least one of said members for providing said relative rotational movement, and linearly variable electric means for varying the speed of said electric motor over a speed range at least equal to the increment between the speed ratios of successive power transmission means.

4. A control system for a drive means providing relative rotational movement between first and second members, said first and second members adapted to have a second relative movement other than rotational, said system comprising, a generator having a field and a variable energy output for controlling the rotational speed of said drive means, a controllable rectifier system for applying a variable voltage to said field, means for automatically varying the output of said controllable rectifier in accordance with the second relative movement of said members, and manual means for predeterminably selecting any relative rotational surface speed of said members over a continuously variable range within the limits of the drive means, said manual means including a plurality of selectable power transmission means having different speed ratios for connecting said drive means to at least one of said members, and variable electrical means for varying the speed of said drive means for a speed range at least equal to the increment between the speed ratios of successive power transmission means.

5. A control system for a drive means providing relative rotational movement between first and second members, said first and second members adapted to have a second relative movement other than rotational, said system comprising, a variable voltage direct curent generator for supplying energy to said drive means, said generator having a field and an armature, motive means for said armature, a controllable rectifier system for applying a variable voltage to said field, automatic means for automatically varying the output of said controllable rectifier system in accordance with said second relative movement, and manual means for selecting any continuously variable relative rotational surface speed within the limits of said drive means, said manual means including a plurality of selectable gearing means having different gear ratios for connecting said drive means to one of said members for said relative rotational movement, and variable electrical means for varying the speed of said drive means over a range of approximately X to 1, said plurality of gearing means each having a gear ratio approximately X times as great as the preceding gear ratio where X is a number of the order of two or three.

6. A control system for a motor rotating a first member about an axis, a second member, said members adapted to have a relative movement between the axis of said first member and said second member, said control system comprising, a variable voltage direct current generator for supplying energy to said motor, said generator having a field and an armature, motive means for said armature, a controllable rectifier system for applying a variable voltage to said field, automatic means for automatically varying the output of said controllable rectifier system in accordance with said relative movement, and manual means for selecting any continuously variable rotational surface speed of said first member relative to said second member, said manual means including a plurality of selectable gearing means having different gear ratios for connecting said motor to said first member, variable electrical means for varying the speed of said motor over a range of approximately X to 1, said plurality of gearing means each having a gear ratio approximately X times as great as the preceding gear ratio where X is a number of the order of two or three, said controllable rectifier including a full wave gaseous rectifier system, a first thermionic tube for varying the bias of said gaseous rectifier system, a first biasing potentiometer for varying the bias of said first thermionic tube, and compensating means for compensatingly varying the bias in accordance with varying load requirements of said controllable rectifier.

7. A control system for a motor rotating a first member about an axis, a second member, said members adapted to have a relative movement between the axis of said first member and said second member, said control system comprising, a variable voltage direct current generator for supplying energy to said motor, said generator having a field and an armature, motive means for said armature, a controllable rectifier system for applying a variable voltage to said field, automatic means for automatically varying the output of said controllable rectifier system in accordance with said relative movement, and manual means, said manual means including a plurality of selectable gearing means having different gear ratios for connecting said motor to said first member, variable electrical means for varying the speed of said motor over a range of approximately X to 1, said plurality of gearing means each having a gear ratio approximately X times as great as the preceding gear ratio where X is a number of the order of two or three, said controllable rectifier including a full wave gaseous rectifier system, a first thermionic tube for varying the bias of said gaseous rectifier system, a first biasing potentiometer for varying the bias of said first thermionic tube, and compensating means for compensatingly varying the bias in accordance with varying load requirements of said controllable rectifier, said compensating means including a second thermionic tube connected to vary the bias of said gaseous rectifier system, a second biasing potentiometer for varying the bias of said second thermionic tube, and means for varying said second biasing potentiometer in accordance with the change of said manually controlled variable electrical means.

8. A control system for a motor providing relative rotational movement between first and second members, said first and second members adapted to have a second relative movement other than rotational, said system comprising, a variable voltage direct current generator for supplying energy to said motor, said generator having a field and an armature, motive means for said armature, a controllable rectifier system for applying a variable voltage to said field, automatic means for automatically varying the output of said controllable rectifier system substantially as a nonlinear function of said second relative movement, and manual means, said manual means including a plurality of selectable gearing means having different gear ratios for connecting said motor to one of said members for said relative rotational movement, variable electrical means for varying the speed of said motor over a range of approximately X to 1, said plurality of gearing means each having a gear ratio approximately X times as great as the preceding gear ratio where X is a number of the order of two or three, said controllable rectifier including a full wave gaseous rectifier system, a first thermionic tube for varying the bias of said gaseous rectifier system, a first biasing potentiometer for varying the bias of said first thermionic tube, and compensating means for compensatingly varying the bias in accordance with varying load requirements of said controllable rectifier, said compensating means including a second thermionic tube connected to vary the bias of said gaseous rectifier system, a second biasing potentiometer for varying the bias of said second thermionic tube, and means for varying said second biasing potentiometer in accordance with the change of said manually controlled variable electrical means, said automatic means including said first thermionic tube, said first biasing potentiometer, and means for varying said first biasing potentiometer in accordance with said second relative movement.

9. A control system for an electric motor providing relative rotational movement between first and second members, said first and second members adapted to have a second relative movement other than rotational, said system comprising, a variable voltage generator for supplying energy to said electric motor, said generator having a field, a controllable rectifier system for applying a variable voltage to said field, linearly variable automatic means for automatically varying the output of said controllable rectifier system in a nonlinear manner in accordance with said second relative movement, and manual means including a plurality of selectable power transmission means having different speed ratios for connecting said electric motor to at least one of said members for said relative rotational movement of said members, and linearly variable electrical means for varying the speed of said electric motor over a range of approximately X to 1, said plurality of power transmission means each having a speed ratio approximately X times as great as the preceding speed ratio where X is a number of the order of two or three.

CLAUDE E. GREENE.
ROBERT B. LESHER.

REFERENCES CITED

The following references are of record in the file of this patent:

UNITED STATES PATENTS

| Number | Name | Date |
|---|---|---|
| 660,801 | Riddell | Oct. 30, 1900 |
| 798,391 | Clark | Aug. 29, 1905 |
| 1,233,877 | Henderson | July 17, 1917 |
| 1,389,433 | Brophy | Aug. 30, 1921 |
| 2,150,032 | Herman et al. | Mar. 7, 1939 |
| 2,389,368 | King | Nov. 20, 1945 |